United States Patent
Haddad et al.

(10) Patent No.: US 11,790,673 B2
(45) Date of Patent: Oct. 17, 2023

(54) METHOD FOR DETECTION OF CELLS IN A CYTOLOGICAL SAMPLE HAVING AT LEAST ONE ANOMALY

(71) Applicant: OFFICE NATIONAL D'ETUDES ET DE RECHERCHES AÉROSPATIALES, Palaiseau (FR)

(72) Inventors: Zehira Haddad, Palaiseau (FR); Stéphane Herbin, Paris (FR); Adrien Chan-Hon-Tong, Bourg la Reine (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 610 days.

(21) Appl. No.: 17/041,936

(22) PCT Filed: Mar. 28, 2019

(86) PCT No.: PCT/FR2019/050718
§ 371 (c)(1),
(2) Date: Sep. 25, 2020

(87) PCT Pub. No.: WO2019/186073
PCT Pub. Date: Oct. 3, 2019

(65) Prior Publication Data
US 2021/0012088 A1 Jan. 14, 2021

(30) Foreign Application Priority Data

Mar. 29, 2018 (FR) .................... 18 00251

(51) Int. Cl.
*G01N 21/29* (2006.01)
*G06V 20/69* (2022.01)
(Continued)

(52) U.S. Cl.
CPC ....... *G06V 20/698* (2022.01); *G01N 15/1475* (2013.01); *G01N 21/251* (2013.01);
(Continued)

(58) Field of Classification Search
CPC ............... G06V 20/698; G06V 20/695; G01N 15/1475; G01N 21/251; G01N 21/29; G01N 2015/1006; G01N 2015/1402
See application file for complete search history.

(56) References Cited

U.S. PATENT DOCUMENTS

| | | |
|---|---|---|
| 5,933,519 A | 8/1999 | Lee et al. |
| 2005/0136549 A1 | 6/2005 | Gholap et al. |

(Continued)

FOREIGN PATENT DOCUMENTS

| | | |
|---|---|---|
| JP | 2009-511002 A1 | 3/2009 |
| WO | 00/03246 | 1/2000 |

(Continued)

OTHER PUBLICATIONS

Office Action issued in Japanese Patent Application No. 2020-552248 dated Jan. 10, 2023.

(Continued)

*Primary Examiner* — Chuong A Ngo
(74) *Attorney, Agent, or Firm* — NIXON & VANDERHYE

(57) ABSTRACT

Disclosed is a method for detecting cells having at least one anomaly in a cytological sample on the basis of at least one first digitised digitised-electron-microscopy image of the sample.

20 Claims, 6 Drawing Sheets

(51) Int. Cl.
G01N 15/14 (2006.01)
G01N 21/25 (2006.01)
G01N 15/10 (2006.01)

(52) U.S. Cl.
CPC ..... *G01N 21/29* (2013.01); *G01N 2015/1006* (2013.01); *G01N 2015/1402* (2013.01)

(56) References Cited

U.S. PATENT DOCUMENTS

| | | | |
|---|---|---|---|
| 2006/0072805 A1* | 4/2006 | Tsipouras | G01N 15/1475 382/134 |
| 2006/0188140 A1* | 8/2006 | Gholap | G06V 20/69 382/133 |
| 2012/0262705 A1 | 10/2012 | Zahniser et al. | |
| 2017/0371886 A1* | 12/2017 | Chen | G06F 17/18 |

FOREIGN PATENT DOCUMENTS

| | | |
|---|---|---|
| WO | 2005/045734 | 5/2005 |
| WO | 2017/194556 A1 | 11/2017 |

OTHER PUBLICATIONS

Ogura et al., "Development of an in-solution observation method using atmospheric scanning electron microscopy (ASEM)—Interdisciplinary research between semiconductor fabrication technology and biological electron microscopy;" Synthesiology, Aug. 2015, vol. 8, No. 3, pp. 116-126.

Hayakawa, "The clinical and cytologic studies on urothelial tumors of the upper urinary tract," Report 3: Scanning electron microscopy of normal upper urothelium and tumor cells of renal pelvic and ureteral tumors, The Japanese Journal of Urology, 1978, vol. 69, No. 11, pp. 1439-1456.

Suzuki et al., "Scanning electron microscopic exfoliative cytology in patients having malignant or non-malignant urothelial diseases," The Japanese Journal of Urology, 1986, vol. 77, No. 2, pp. 233-242.

Ohnuki et al., "A study of a quantitative evaluation method by contour complexity of the nucleus image for cancer cell diagnosis," Information Processing Society of Japan and The Institute of Electronics, Information and Communication Engineers, FIT2013 (12th Information Processing Society of Japan Forum), 2013, vol. 2, pp. 401-402.

Tsukada, "Extraction and Classification of Cell Nuclei Using CNN Features," 2017 Master's Thesis, Nagoya Institute of Technology Graduate School, Graduate School of Engineering Department of Information Engineering, 2017, 45 pages.

International Search Report for PCT/FR2019/050718 dated Jul. 25, 2019, 6 pages.

Written Opinion of the ISA for PCT/FR2019/050718 dated Jul. 25, 2019, 7 pages.

Peng et al., "Clustering nuclei using machine learning techniques", Complex Medical Engineering (CME), 2010 IEEE/ICME International Conference on Jul. 1, 2010, XP055531089, pp. 52-57 (7 total pages).

* cited by examiner

METHOD FOR DETECTION OF CELLS IN A CYTOLOGICAL SAMPLE HAVING AT LEAST ONE ANOMALY

CROSS-REFERENCE TO RELATED APPLICATIONS

This application is the U.S. national phase of International Application No. PCT/FR2019/050718 filed Mar. 28, 2019 which designated the U.S. and claims priority to French Application No. 18 00251 filed Mar. 29, 2018, the entire contents of each of which are hereby incorporated by reference.

BACKGROUND OF THE INVENTION

Field of the Invention

The present invention relates to a method for detection of cells in a cytological sample having at least one anomaly, based on one digitized image or several digitized images of the same sample. The invention also relates to a device implementing this method.

Description of the Related Art

The invention relates to the field of cytology which is the microscopic study of cells from a cytological sample after fixing on a slide. More precisely, it involves the study of morphological, radiometric or biochemical aspects of normal or atypical cells, meaning cells having at least one anomaly.

Cancer screening is one of the fields of application of cytology, and consists of looking for and finding a cancer by means of cytological samples collected from a subject. Screening is done in part in an anatomy-pathology laboratory by cytotechnicians and cytopathologists trained in the methods for detection of atypical cells. Cytology is very useful for the detection of some cancers because it allows diagnosing them at various stages, since some cancers, for example, have an early stage called "low-grade" and a more advanced stage called "high grade." (The grade may also correspond to a type of cancer.) Early diagnosis of a cancer is obviously a major issue with significant repercussions related to the survival rate of affected patients and also on the corresponding costs for caring for them. For example, each year in connection with bladder cancer, 10 million urinary cytological studies were done worldwide to help diagnose it; the analysis of samples on cytology slides coming from spontaneous urination is a current practice in order to diagnose a bladder cancer.

However, this method of diagnosis by the analysis of cytological samples is limited both from a human aspect—meaning the experience and the decreasing number of cytopathologists and cytotechnologists—and also by a low sensitivity for certain cancers. Typically, there is a very low sensitivity for diagnosis of low-grade bladder cancer because atypical or abnormal cells have not yet undergone pronounced morphological deformations and are therefore hard to detect by human eye. There is therefore a need to look for procedures that can be used routinely and at low cost which would serve to increase the performance and also the reliability of this entire practice.

SUMMARY OF THE INVENTION

Based on this situation, one of the goals of the invention consists of providing a method for detection of cells in a cytological sample having at least one cellular anomaly so as to subsequently help in cancer detection, in particular bladder cancer, based on digitized slide images. Advantageously the invention provides, by means of a computer-implemented processing module, automated and exhaustive analysis of cells from the sample present on the slide. Thus, the analysis of the cytological sample and of all the potentially abnormal cells is complete, quick, more precise and serves to overcome the common analysis errors of cytopathologists and cytotechnicians. Further, this method assures the standardization of the cytological analysis result for the sample. But again, this method further serves to help early diagnosis of cancer called low-grade, in particular low-grade bladder cancer, by detecting cells having minor anomalies.

The invention aims to remedy the disadvantages from the state-of-the-art cited above and is motivated by the absence of alternative solutions. To reach this goal or others, a first aspect of the invention proposes a method for detection of cells in a cytological sample having at least one anomaly based on at least one first digitized electron microscope image of the sample, characterized in that the method is done by means of a computer-implemented processing module, in particular completely executed by the computer-implemented processing module.

The method comprises a step of processing the first image, comprising the following substeps:
 starting from the first image, detect each element present in the sample, selected from at least one isolated cell or one cell group, by means of a colorimetric detection;
 filter each isolated cell and/or each cell group by means of the colorimetric detection;
 starting from each detected group of cells, individualize at least one cell with the nucleus thereof, by means of at least one segmentation method based on detection of the contours in the cell group;

Additionally, the method further comprises a step of cellular anomaly detection, comprising the following substeps:
 for each cell isolated or individualized in the preceding step, calculate data for two characteristics of distinct anomalies called "expert characteristics of anomaly," and determine whether said cell has at least one anomaly, by comparing these calculated data with reference data;
 and then count the total number of cells in the sample having at least one anomaly;

And finally, it further comprises a first step of characterization of the sample according to an anomaly level for the sample, comprising the following substeps:
 compare the total number of cells having at least one anomaly to a threshold value for the anomaly level, preferably a threshold value equal to at least three cells each having at least one anomaly;
 if the total number of cells having at least one anomaly is less than the threshold value for the anomaly level, classify the sample in a class representative of a sample with a zero anomaly level;
 if the total number of cells having at least one anomaly is greater than the threshold value for the anomaly level, classify the sample in a class representative of a sample with a proven anomaly level, meaning a low or high anomaly level.

According to this aspect of the invention, the detection method classifies, in the end, the cytological sample according to a cellular anomaly level based on the analysis of at least one first image, preferably with a second image. The processing module used in the invention is able to combine data calculated from the first digitized transmission electron microscope image and/or from a second digitized fluorescence microscope image of the sample with reference data known in cytology.

It will be understood that during the processing step of the first previously cited image, several constituent elements from the first image are detected, in particular isolated cells, cell groups, elements to be rejected or cell clusters which cannot be analyzed and which are therefore set aside for the method to move on.

The solution makes it possible to benefit from the classification of the sample according to two classes and to diagnose whether the sample has a zero or a proven cellular anomaly level. Subsequently, this result will significantly help the diagnosis by a specialist of a cancer or not.

Further, it will be noted that according to the invention an expert characteristic of anomaly of a cell can be considered as a good indicator of the conformity of the cell.

Preferably, one of the expert characteristics of anomaly is a surface area ratio of the nucleus in the cell or an irregularity of the nucleus or a mottled colorimetry or a hyper-colorimetry of the nucleus. "Mottled colorimetry" is understood to mean the measurement of the coloration intensity of certain points or spots.

Again preferably, the expert characteristic of anomaly is a characteristic of the nucleus, in particular, a size ratio of the nucleus in light of the size of the cell, a positioning of the nucleus in the cell, or a colorimetric characteristic of the nucleus. More precisely, the expert characteristic of anomaly is a surface area ratio of the nucleus in the cell or an irregularity of the nucleus or a mottled colorimetry or a hyper-colorimetry of the nucleus.

Advantageously, at least one of the expert characteristics of anomaly is an irregularity of the nucleus, where the calculation of said irregularity of the nucleus is a deviation calculation corresponding to the comparison between each analyzed cell nucleus and a nucleus type called reference for a cell called "reference" in cytology. This deviation calculation is selected from the following list: a surface difference, a perimeter difference, a difference of the convexity of the nucleus, a barycenter difference, a difference between a length of the contour of each nucleus detected, a difference of irregularity of a contour of the nucleus, a difference of the number of pixels in each nucleus and a difference of eccentricity of the nucleus in the cell.

According to a specific embodiment, the at least one expert characteristic of anomaly is a length of the contour of the nucleus, where the calculation of this characteristic further comprises the following substeps:
  calculating a real contour of the nucleus by using a method of contour extraction for the nucleus;
  determining a diameter of the nucleus, preferably the largest diameter, by tracing a bounding envelope of the nucleus;
  tracing a C2 rank closed convex curve bounding envelope of which is that of a reference nucleus;
  calculating a difference between the actual contour of the nucleus and the traced convex curve, representing the contour of a reference nucleus.

According to a specific embodiment, the at least one expert characteristic of anomaly is an irregularity of a contour of the nucleus, where the calculation of this characteristic further comprises the following substeps:
  detecting at least one angular point in the contour of the detected nucleus;
  calculating a total number of angular points in the contour of the nucleus;
  measuring an angle for each corresponding angular point, and then
  determining the degree of irregularity of the contour of the nucleus by combining the data for the number of detected angular points per nucleus and their angles.

According to a specific embodiment, the method according to the invention comprises a step of typological selection, comprising the following substeps:
  starting from the first digitized image of the sample, measuring the size of the cells, and then classifying the cells according to their size;
  matching each class of cells with a corresponding cell type, and then selecting at least one cell type selected corresponding to a cell size, such as the urothelial cell type.

According to a specific embodiment, the invention may further comprise a second step of characterization of the sample following the anomaly level of the cells from the sample. This second step further comprises the following substeps:
  starting from a second digitized fluorescence image of the sample, selecting all the cells of a selected cell type, such as urothelial, according to their location in the sample previously predefined in the first digitized image;
  detecting the presence of a fluorescence halo around each previously selected cell, preferably measuring the fluorescence level, again preferably measuring a level of spread of the fluorescence;
  if a fluorescence halo is detected, preferably if a minimum level of fluorescence is measured, also preferably a minimum spreading level of the fluorescence is measured, classify the sample in a class representative of a sample with a low anomaly level;

According to another specific embodiment, the invention comprises a step of recommendation of usability of the sample according to a number of cells comprising a nucleus and according to a minimum usability threshold value, preferably the minimum usability threshold value is equal to at least seven cells in the first image comprising a nucleus.

According to the invention, the method, by means of the processing module, combines all resulting data and classifies the cytological sample analyzed based on the first image and the second image, into one of three classes associated with the cellular anomaly level: zero, low or high.

The second aspect of the invention proposes a method for detection of cells in a cytological sample having at least one anomaly based on a first image and/or a second image by means of a deep learning method, by means of a processing module implemented by computer, for assigning the sample to one of three classes associated with a cellular anomaly level of the sample: zero, low or high.

This method is advantageous in that it uses the data provided by at least one of the variants of the first aspect of the invention.

Preferably, the cytological sample is a urinary sample from spontaneous urination.

A third aspect of the invention proposes a device implementing a method such as described above.

A fourth aspect of the invention proposes the use of the method such as described below for aiding in the diagnosis of bladder cancer.

BRIEF DESCRIPTION OF THE DRAWINGS

Other specifics and advantages of the present invention will appear in the following description of nonlimiting implementation examples made with reference to the attached drawings in which.

DESCRIPTION OF THE PREFERRED EMBODIMENTS

It must first be noted that the figures disclose the invention schematically. These figures represent implementation examples given without limitation and not necessarily adhering to a specific chronology.

The present invention falls in the general category of the application of computer vision of digitized images of complex and numerous objects. The invention deals with an original method for detecting cells in a cytological sample having at least one anomaly based on a first digitized image and preferably using a second digitized image of the same sample. The first images obtained with a transmission electron microscope and the second image is obtained with a fluorescence microscope. The images used come from the specific digitization of a cytological sample having undergone a preparation suited for the method, which was then spread on a cytology slide. The method according to the invention can use a cytological sample coming without distinction from fluid or from collection of elements from the human body according to the desired analysis. For the embodiment presented here, a urine sample from spontaneous urination is taken. In this context, the result of this method for detection of cells in a cytological sample having at least one anomaly will serve to help the diagnosis of a bladder cancer, in particular at an early stage or so-called low-grade bladder cancer.

Figure 1:
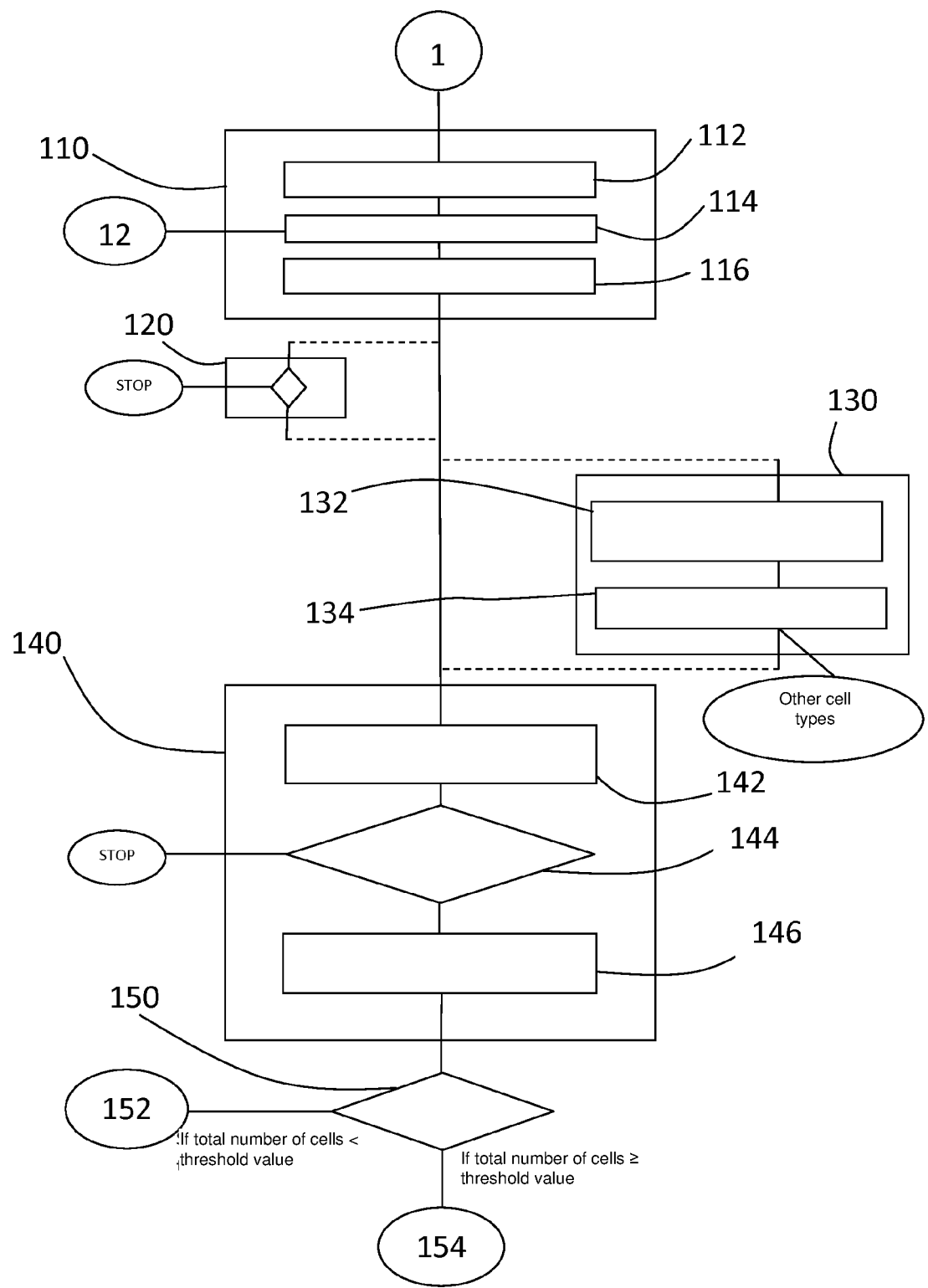
FIG. 1 is a drawing showing the various steps of the method implemented according to a preferred mode of the invention.

In the remainder of the description and as shown in FIG. 1, a preferred embodiment is now going to be described comprising several steps which can be preliminary, intermediate or successive. It will be understood that according to the selected embodiment one or more of these steps could be added to or removed from the method according to the invention.

Advantageously, the detection method according to the invention comprises steps executed by means of a processing module implemented by a computer able to combine data calculated from the sample with reference data known from cytology. The data, referred to as calculated, are calculated and gathered by the processing module from at least one digitized image of a slide of at least one sample. Using a learning method, the processing module can thus combine all the data calculated and gathered from the sample or from several samples with reference data known from cytology.

Figure 2:
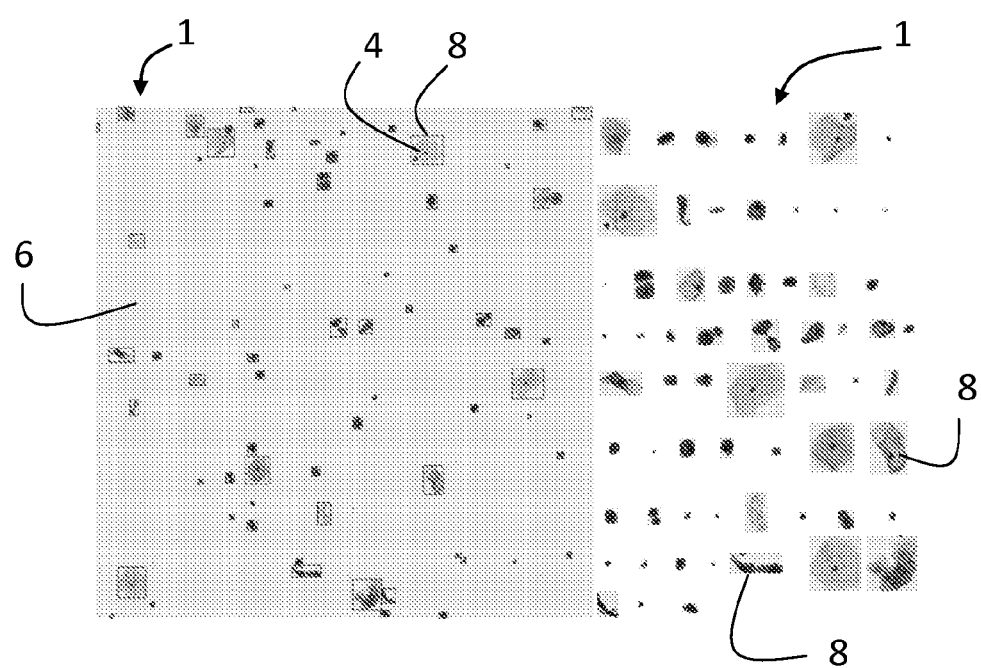
FIG. 2 shows a first example of a digitized electron microscope image of a sample before and after processing step. Here the first image comprises in particular isolated cells, cell clusters, cell groups and elements to be rejected.
Figure 3:
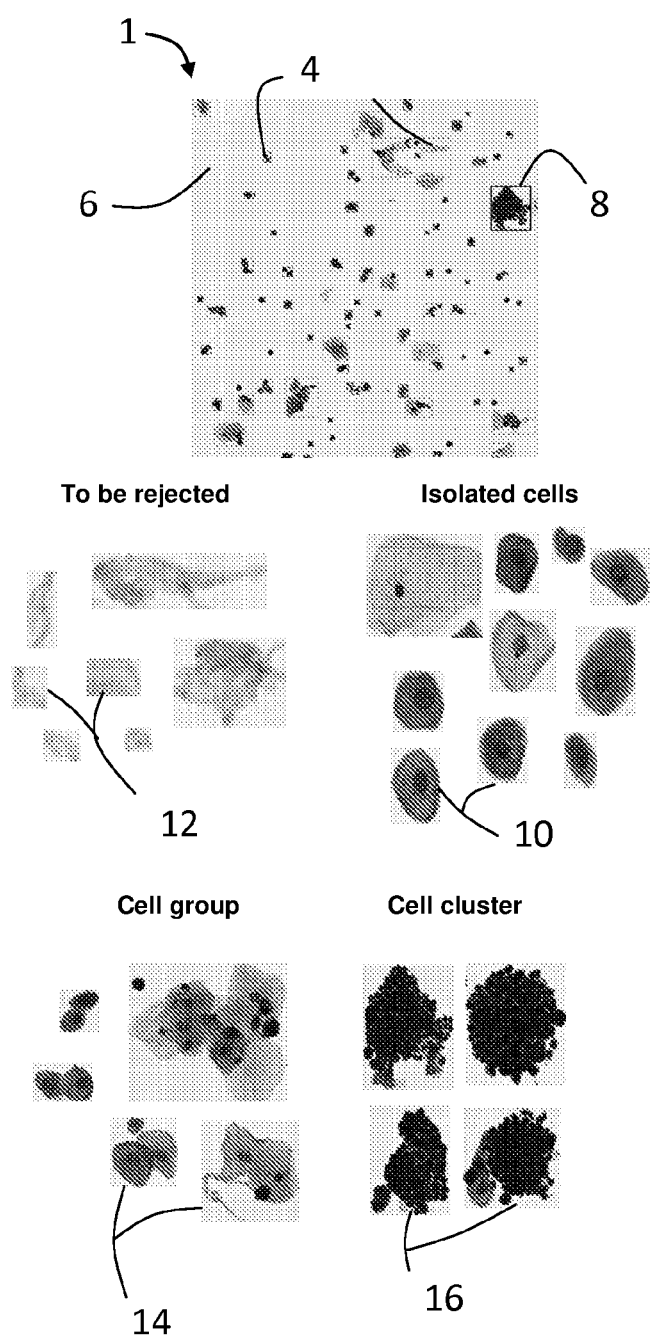
FIG. 3 shows a second example of a digitized electron microscope image of a second sample before and after a processing step of the first image. Here the first image comprises in particular isolated cells, cell clusters, cell groups and elements to be rejected.

According to a preferred embodiment presented here, the detection method according to the invention comprises a preliminary image processing step 110. The objective of this preliminary image processing step 110, shown in FIGS. 1 to 3, is to improve as much as possible the starting selection of cells, in particular by setting aside elements 4 making up a first digitized image 1 which could interfere and reduce the refinement the result of the detection method. To do this, this preliminary processing step 110 comprises a substep for detection 112 of the elements 4 present in the first image 1. This detection substep 112 is at least in part based on a colorimetric detection which can consist at least in part of a segmentation of the full range of colors from the first image 1 into several groups, the lightest and most widespread group corresponds to the background color of the image 6 and the darkest group corresponds to the color of the cellular nuclei. It is considered that any pixel that is not a pixel from the background of the image 6 is a pixel from an element 4, meaning from a biological object. Thus, the background of the image 6 is determined and everything that is not part of the background of the image 6 corresponds to an element 4, meaning, a cell, a cell group, a cell cluster, or an element to be rejected. Then, all the elements 4 are extracted from the background of the image 6 by creating several image fragments 8 by means of a segmentation method. In order to categorize the various elements 4 detected, this colorimetric detection, detecting the nuclei, is further used; here this substep is referred to as "coarse."

Further, this first substep of detection of nuclei, meaning of colorimetric detection, could be combined with measurements of the dimensions of each of the elements 4 detected. For example, if several nuclei are detected by colorimetric detection, the measurement of this element will help to identify the detected element 4 type.

At the outcome of the detection substep 112, it is thus possible by means of the colorimetric detection of the nuclei, and possibly from the measurement of these elements 4, to identify various pre-classes of elements 4 making up the first image 1, such as:

Elements to be rejected: This is everything which does not constitute a cell with a nucleus. In fact, any element without a nucleus is rejected, because it cannot be interpreted, this could either be waste, or a false detection.

Isolated cells: These are image fragments which contained only a single nucleus and which are consequently isolated cells.

Cell group: These are grouped cells (which touch or which overlap) and which therefore contain several nuclei.

Clusters: These are specific groupings of very dense (very dark) cells and where the cells overlap very specifically.

What distinguishes the clusters from conventional groupings of cells is the fact of having in the clusters a greater surface area in the "nucleus" class.

In more detail, FIG. 3 shows a sample first image 1 undergoing the preliminary processing step 110. As described earlier, during this step 110, the first image 1 undergoes segmentation in order to get image fragments 8 surrounding the elements 4 having a dark color, where these image fragments 8 are then pre-classified into four classes: elements to be rejected 12, isolated cells 10, cell groups 14 and cell clusters 16 (which are also rejected). In order for the good operation of the invention, the detection method according to the invention must be done starting with cells that must be isolated or individualized from a cell group and comprising a nucleus. The isolated cells 10 and the cell groups 14 are filtered during a filtering substep 114 using colorimetric detection.

Consequently, the pre-classified cell group 14 undergoes a substep of individualization 116 after the substep of filtering 114. This substep 116 consists of individualizing the cells from the cell group 14. "Individualizing" is understood to mean extracting at least one cell comprising a nucleus from the cell group 14. It will be noted that this substep of individualization 116 is not executed for those preclassified as "cell clusters" 16. In fact, the cell clusters 16 are structures that are too complex to individualize and considering them would result in many more errors than usable pertinent information. That is why the clusters 16 are not used according to the invention. The substep of individualization 116 of the cells is done by means of a new segmentation which is based, on the detection of contours via the calculation of the gradient of the first image or via the use of a mathematical transformation which has a multidirectional aspect such as Radon, Gabor or the multidirectional multi-scale transformations. After having determined the contours and possibly by means of a mathematical morphological approach, any structure included in a closed contour, therefore corresponding to a cell, is extracted and it is defined as being an individualized cell and of interest for the remainder of the method according to the invention.

According to the embodiment preferred here, an optional step of recommendation of usability of the sample 120 for detecting potentially cancerous cells may be done. According to the embodiments, this step of recommendation of usability 120 can be done one or more times at several levels during the progress of the method according to the invention, preferably at the end of the preliminary processing step 110. This step of recommendation of usability 120 amounts to estimating whether the first image 1 contains a sufficient number of cells comprising a nucleus so that the detection in the sample will not be biased. To do that, the total number of cells with nuclei present in the first image 1 is determined. This total number of cells will be communicated to a user who will confirm or not the continuation of the method according to the invention. Preferably, this total number of cells with nuclei is compared to a value of a minimum usable threshold which will be determined by the user in advance. As a variant, the user may reenter the desired value for the minimum usable threshold for the sample in the processing module in order to allow automatic continuation or not of the method from the invention. Consequently, the detection method may continue even if there are very few cells with nuclei in the first image 1 in so far as the total number of these cells is greater than or equal to the value of the minimum usable threshold. For example, the value of the minimum usable threshold is equal to at least seven cells with nuclei detected in the sample; thus the method continues if the total number of cells with nuclei is greater than or equal to seven. Inversely, if the number of cells with a nucleus is insufficient, then the step of recommendation of usability 120 can interrupt the detection method.

According to an embodiment preferred here, an optional preliminary step of typological selection 130 in order to detect cells from a selected cell type in the sample with at least one cellular anomaly, more precisely, potentially cancerous can be done. To do that, starting from the first image 1, the cells from the sample are measured and then classified according to their size, step 132. By means of the processing module, the cells classified according to their sizes are grouped by cell types, and then selected according to the chosen cell type, such as urothelial or any other cell type for which a cellular anomaly level could be correlated with a cancer type, step 134. According to a variant, the user may define the preferred cell type themselves. For example, for a detection method applied to urinary cytology samples for aiding in diagnosis of bladder cancer, the preferred cell type will be the urothelial type. In general, the study of urothelial cells is a good indicator for helping a bladder cancer diagnosis, in particular for determining the stage of the cancer based on the anomalies encountered.

Following the preliminary image processing step 110, the optional step of recommendation of usability of the sample 120, and the optional preliminary step of typological classification 130, a refined selection of isolated or individualized cells that comprise one nucleus and one chosen cell type is obtained.

As a reminder, the method according to the invention leads to the detection of cells having at least one anomaly in the cytological sample based on at least one first image. The cellular anomaly level of the sample is correlated to the number and type of cellular anomaly encountered in the cytological sample. In other words, the method according to the invention can serve to classify the sample either in a cellular anomaly-level class called proven, or in a cellular anomaly-level class called zero.

To do that, the preferred embodiment shown in FIG. 1 further comprises a step of cellular anomaly detection 140 in the sample. According to the invention, a cell having an anomaly is defined as a cell having an expert characteristic of anomaly divergent from data called reference, meaning divergent from the norm. In other words, it involves the cell which has at least one anomaly, meaning one expert anomaly characteristic which is abnormal. Thus the calculation of one expert characteristic of anomaly serves to get data which helps to determine deviation from the norm and therefore the presence or not of an anomaly. The calculation of expert characteristics of anomaly is understood to mean measurement or any other type of mathematical method. According to the invention, the expert characteristic of anomaly which is calculated is a characteristic of the nucleus, in particular corresponds to a size ratio between the nucleus and the cytoplasm of the cell or to a measurement of the positioning of the nucleus or to a colorimetric measurement of the nucleus. More precisely, the expert characteristic of anomaly corresponds to a surface area ratio of the nucleus in the cell or an irregularity of the nucleus or to a mottled colorimetry or to a hyper-colorimetry of the nucleus. The various expert characteristics of anomaly mentioned above, without limitation, can uncover anomalies according to values calculated in the sample. It will be understood that other types of expert characteristics of anomaly may be calculated and used without distinction as parameters for classifying the cells.

The anomalies sought and detected in each cell are going, more specifically, to relate to the nucleus thereof. To do that, a refined detection of the nucleus is needed in order to be able to detect anomalies related thereto.

Figure 4:
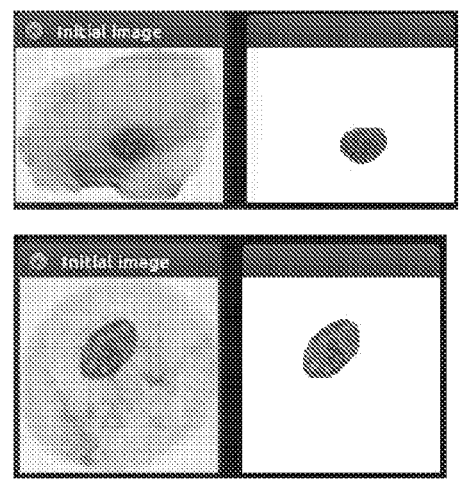
FIG. 4 represents two electron microscope images of an isolated cell and two electron microscope images of their nuclei extracted by means of a processing module implemented by computer.
Figure 5:
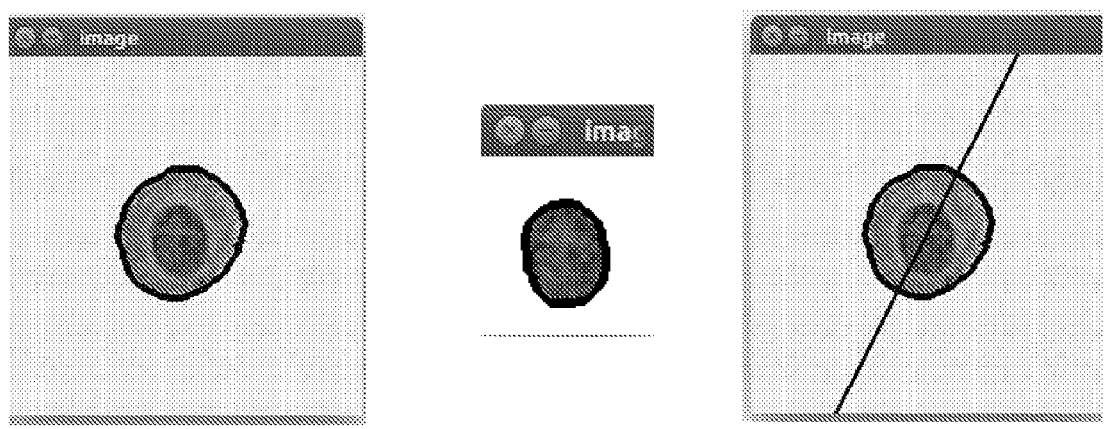
FIG. 5 represents electron microscope images of an isolated cell, the extracted nucleus thereof and an example of a trace for measuring the nucleus cell size ratio, by means of a processing module implemented by computer.

The refined detection of the nucleus is done by a segmentation. This segmentation can in particular be done by improving on the coarse segmentation using solely colorimetry. This technique described earlier in the description consists of preferably forming a rectangle around the nucleus, based on a bounding envelope. This bounding envelope will delimit a zone around the nucleus, always included in the cell, and extending beyond the nucleus by 10 to 40% (of the total surface of the nucleus), preferably between 20 and 30%. FIGS. 4 and 5 each show the result of a refined nucleus detection.

According to the embodiment, the nucleus may already have been detected during the preliminary image processing step 110 during the coarse detection of nuclei by means of the first segmentation. The sample implementation consists of considering the bounding envelope used for coarse detection of the nucleus and estimating the color distribution of the nucleus in this envelope and also that of the background by using a Gaussian mixture model. Later, it is used for constructing a random Markov chain on the labels of the pixels with an energy function which prefers connected regions having the same label, and executing an optimization based on the Graph cut for interfering the values thereof. As this estimate could be more precise than the original extracted from the bounding box, these two steps are repeated until they converge.

The step of cellular anomaly detection 140 in the cells from the sample is done in part by the calculation of at least two distinct expert characteristics of anomaly, step 142.

In the remainder of the description, the calculation of four types of expert characteristics of anomaly is described each showing the presence or not of a morphological cellular anomaly.

First, the calculation of the expert characteristic of anomaly of the nucleus/cytoplasm ratio in the cell is going to be described.

Calculating the NCR (Nucleus Cell Ratio) by means of the automated processing module is proposed; the ratio is defined by the following formulas:

NCR=length of the largest diameter of the nucleus/length of the largest diameter of the corresponding cell.

FIG. 5 shows a sample implementation of the calculation of the NCR ratio. The following are the steps of the calculation by the processing module:
1. Trace the longest axis corresponding to the cell;
2. Calculate the length of the axis delimited by the cell;
3. Calculate the length of this same axis delimited by the nucleus.

Another way of calculating this ratio is also proposed based on calculation of the surface areas.

NCR=(surface area of the nucleus/surface area of the cell)$^{1/2}$

Where:
Surface area of the cell=number of pixels in the cell; Surface area of the nucleus=number of pixels in the nucleus.

This ratio is a number less than 1 because the nucleus is inside the cell. If the NCR is very close to 1, the cell is considered as being "a bare nucleus" and will therefore be rejected by the processing module during the method. Letting the user have control so they can enter a threshold above which the cell is considered as "a bare nucleus" is therefore proposed. The same is proposed for the thresholds indicating a normal, critical or abnormal NCR. These thresholds will be initialized to the following values by default:
   a) NCR<0.5 corresponding to a normal NCR
   b) 0.5<NCR<0.7 corresponding to a critical NCR
   c) NCR>0.7 corresponding to an abnormal NCR
   d) NCR>0.9 corresponding to a bare nucleus, not counted and "to be rejected"

More precisely, the nucleus/cell ratio is calculated from the ratio between the largest diameter of the cell and the largest diameter of the nucleus. Should the cell not be very spherical, the actual diameter is not used, instead the end-to-end distance or length of the cell, corresponding to the largest diameter of the cell, is used. All ratios included between 0.9 and 1 are uninterpretable because that corresponds to bare nuclei. The ratios over 0.7 correspond to a large anomaly and the ratios included between 0.5 and 0.7 correspond to a small anomaly.

Second, the calculation of another expert characteristic of anomaly, irregularity of the nucleus, is going to be described.

An irregular nucleus is understood to mean any nucleus whose contour deviates from a very smooth and regular conventional nuclear contour shape, referred to as reference. It can also be seen as a contour having angular points or corners.

To do this, calculating the irregularity of the nucleus via three methods is proposed. The third method described is the merging of the two other methods.

Let us start by describing the first method based on the calculation of the difference from a reference nucleus from a reference cell.

The calculated difference can be a surface area difference or perimeter difference or any other difference such as a barycenter difference, the pixel difference in each region of the nucleus, the difference between the length of the contours of each nucleus (reference and real), the linear difference between the center of gravity of each nucleus, the difference between the number of pixels of convex regions linked to each nucleus, the difference between the eccentricity of the real nucleus and that the reference nucleus. Recall that, the eccentricity e=0 for a circle, 0<e<1 for an ellipse and e=1 for a parabola, the difference in terms of convex regions.

Among other things this method is based on the calculation of the difference between the real contour of the nucleus and the reference contour of the nucleus corresponding to a C2 rank closed convex curve included in a bounding envelope of the nucleus. In order to determine the reference contour of the nucleus, the bounding envelope of the nucleus is defined as a bounding rectangle whose traced length corresponds to the largest diameter of the nucleus. Using the bounding rectangle, the processing module is going to determine a C2 curve inside thereof forming the contour of the nucleus.

As an example, the oval is a C2 rank closed convex curve. Similarly the circle or ellipse are specific cases of oval type C2 closed convex curves.

Then, the contour of the nucleus is extracted by any method for extraction of contours such as: gradient detectors by linear filtering or by masking (like Sobel, Prewitt or Roberts), analytic approaches for extraction of contours (like canny or Deriche filter), active contours by taking the bounding envelope seen previously as initial contour, level sets, contours extracted by multiscale and multidirectional transformations, etc. Summary of the steps to follow for calculating the expert characteristic of anomaly of irregularity of the nucleus using the calculation of the contour of the nucleus:
1. calculating a real contour of the nucleus by using a method of contour extraction;
2. determining largest diameter of the nucleus;
3. tracing a bounding envelope of the nucleus, meaning a rectangle bounding the nucleus for which the length is equal to the largest diameter of the nucleus;
4. based on the bounding envelope, trace a C2 rank closed convex curve forming the estimated contour;
5. calculate a difference value between the real contour of the nucleus and the reference contour of the corresponding reference nucleus corresponding to the curve traced in step 4, by calculating and combining data from the sample and reference data from various expert characteristics of shape anomaly;
6. use the difference in value between the reference contour and the real contour of the nucleus for determining the presence of an anomaly as a function of threshold values that are predetermined or entered by the user, or for combining this data with other data on expert characteristics of anomaly and determining the presence of an anomaly as a function of the threshold values that are predetermined or entered by a user.

It will be understood that these characteristics can be used at the input of a large margin separator type classifier (supervised learning technique which is based on maximization of the margin. The margin is the distance between the separating boundary and the closest samples which are called support vectors. The technique consists in finding the maximum margin separating boundary based on learning examples.) and/or by neural networks which will determine the irregularity of the nucleus by learning.

In a second step, the second method for calculation of the irregularity of the nucleus, based on the detection of angular points in the nuclear contour, is going to be described.

Here the idea is to detect angular points by detecting "corner" type characteristic points, calculating the corresponding angle formed and estimating the degree of irregularity of the nucleus by considering the number of corners detected and the corresponding angles thereof.

Here, a corner is defined as an angle of the nuclear membrane contour. The corner corresponds to the intersection of two lines or two contours of the nuclear membrane, with orientation sufficiently different from the close neighborhood of the corner.

Corners are generally detected by the Harris detector, except that it does not verify the characteristic of scale invariance and can only detect corners in a single scale, which can lead to detecting false corner or to skipping over some important corners, in particular when the images are low contrast.

Another major disadvantage of the Harris detector is that it generally produces an over detection of corners. To remedy that, using the FAST algorithm (Features from Accelerated Segment Test), initially developed by Edward Roston and Tom Drummond, after the Haris detector is proposed. In fact, this latter algorithm can prove useful for eliminating redundant corners. Consequently, it will be applied for eliminating the false corners detected by the Haris detector.

Further, the original and inventive idea proposed in the scope of this invention is to combine the contourlet transformation (multiscale multidirectional transformation), the Harris detector and the FAST algorithm (Features from Accelerated Segment Test) for detecting the corners corresponding to the contour of the nucleus and then extracting the orientations and estimating the irregularity of the nucleus. An objective is to properly estimate the irregularity of the contour the nucleus which defines the nuclear membrane. The original idea is to use a transformation which is excellent at uncovering contours and fully enhancing them in order to be able to properly estimate the irregularity thereof. In that way, the estimate will not be done conventionally in the initial image domain, but in a domain composed of various scales where the contours will be clearly shown and well enhanced in order to properly detect the irregularity thereof. The transformation is therefore a contourlet type multiscale and multidirectional transformation which perfectly represents the curves and the contours. It is a multiscale geometric analysis tool which allows the decomposition along various orientation angles for each scale. Unlike the conventional wavelet transformation, the contourlets perfectly capture the anisotropic characteristics of the images (contour, edge and texture information). Thus, the use thereof for uncovering the irregularity of the contour of the nucleus is undoubtedly very appropriate.

The remainder of the description details the steps for the calculation of the irregularity of the nucleus proposed in the scope of this second method:
1. Decomposing the first image by using the contourlet transformation. There will be several images corresponding to the various scales and to the various orientations;
2. Calculating the correlation matrix Me (matrix relating to the Harris detector) for each pixel of each scale;
3. Deducing the strength of corners (corner response function) for each pixel corresponding to each scale which is estimated by:

$$R_\theta = \det M_\theta - \alpha (\operatorname{trace} M_\theta)^2 \text{ with } 0.04 < \alpha < 0.25$$

More precisely, the strength of the corners is detected via the "corner response function" which is a function which returns high values at the detection of a corner. The larger or stronger the value of this function at a point, the greater the likelihood that it is a corner. The factor $\alpha$ defines the sensitivity of the detector. As a gets larger, the sensitivity is lower and the number of corners will be smaller. Generally, the value of $\alpha$ is set between 0.04 and 0.06. This value may be larger but it does not exceed 0.25.
4. After calculating the corner strength of each pixel, saving the position of the points which have a high value of Re which will correspond to the detected corners. This first detection will be improved later because it may contain both real corners and erroneous corners (problem of over detection of corners);
5. Applying the FAST algorithm for the purpose of judging the density around the circle surrounding the detected point p. Verifying whether there is a set of n contiguous points in the circle which are all brighter than the Intensity(p)+t or darker than the end Intensity (p)−t (where t is a threshold). If that is the case then p is a corner;
6. Using the non-maximal suppression for eliminating the detected corners which are adjacent to each other:
6.1 Calculate a score function V for all corners detected. where V is the sum of absolute differences between the corner p and the 16 pixels surrounding it;

6.2 Compare the score V for adjacent corners in order to eliminate the one which has the lowest score V.
7. Calculate the angle of each corner or angular point detected by calculating the difference in orientation between the two segments of which it is made;

For example, if the orientation of the first segment is 60° and of the second is 45°, then the difference in absolute value is 60°−45°=15°.

Alternatively, the calculation of the angles may be done not from the estimated segments, but directly using the values of the pixels in the first image 1.

8. Calculating a degree of irregularity of the nucleus by combining the data from the number of detected angular points or corners and the respective angles thereof;

Example of Calculation of the Degree of Irregularity:

$$\text{Degree of irregularity of the nucleus} = \sum_{i=1}^{num\ corners} \frac{1}{angle_i}$$

9. Based on the results obtained in step 9, determine the level of irregularity of the nucleus as a function of the threshold values that are predetermined or entered by a user.

In a third step, the third method, consisting of merging the first and second method of calculating the irregularity of the nucleus, is going to be described.

Merging the two preceding methods is proposed. The results from the two preceding methods may be combined by data merging approaches like for example fuzzy logic. Here, in what follows, is an example of rules which could be applied.

1. If the first method gives as a result "regular nucleus" and the second method gives as a result "nucleus with a low degree of irregularity," then the final decision will be "regular nucleus";
2. If the first method gives as a result "irregular nucleus" and the second method gives as a result "nucleus with a medium degree of irregularity," then the final decision will be "irregular nucleus";
3. If the first method gives as a result "irregular nucleus" and the second method gives as a result "nucleus with zero irregularity," then the final decision will be "regular nucleus."

Third, the calculation of another expert characteristic of anomaly, hyper-colorimetry of the nucleus, is going to be described.

Here, calculating the degree of hyper-colorimetry of the nucleus is proposed. The following are the steps:

1. For each cell, calculating an average light intensity of the nucleus thereof, corresponding to the sum of the light intensity of the pixels composing the nucleus divided by the number of pixels in the nucleus;
2. Calculating an average I ref of the average light intensity of the nuclei of all the cells present in the first image 1. I ref is the sum of the average light intensities of all the nuclei of the cells divided by the number of cells;
3. Calculating the intensity of the hyper-colorimetry as being the difference between the average light intensity of the nucleus of the cell to be checked and I ref:

A hyper-colorimetry threshold will be determined by a classification method (e.g. by SVM or neural network type learning). In that way, according to the value obtained and the hyper-colorimetry threshold, the hyper-colorimetry, or not, of the cell will be determined.

For calculating the hyper-colorimetry of the nucleus, in the set of previously described steps, the calculation of the average can arbitrarily be replaced by the calculation of the median.

Fourth, the calculation of another expert characteristic of anomaly, mottled colorimetry of the nucleus, is going to be described.

To do that, three methods are proposed for estimating the mottled colorimetry of the nucleus. The first method is based on the values of the light intensity of the pixels from the image, the second method is based on an estimate in the transformed domain and not in the image domain (in other words, it is not applied to the values of the pixels from the image but to the values of the coefficients in the transformed domain), and the third method consists of merging the two preceding methods.

In a first step, the first method based on the estimation in the image domain is going to be described:

1. Calculating a variance V,
2. Calculating a histogram of the image and detecting a number of peaks (Num peaks) in the histogram, (if there is more than one peak, that means that the nucleus does not have a homogeneous color);
3. Calculating, for each pixel from the image (or block), a tensor based on a gradient in order to form a coherence map. If a pixel has a greater coherence than the average of the coherences for the zone in which it is located, then it is characteristic of an inhomogeneous zone:

If coherence(x,y)>Average (Zone surrounding (x,y))+ 3*Standard Deviation (Zone surrounding (x,y)) then (x,y) belongs to an inhomogeneous zone;

Calculating a sum of the inhomogeneous points (or blocks) detected by the coherence (Num coh);

4. Merging these characteristics [V, Num peaks and Num coh] and using them to detect the mottled colorimetry of the nucleus.

It will be understood that these characteristics can be used as input to an SVM or neural network type classifier.

In a second part, the second method based on the estimation in the transformed domain is going to be described:

Defining a mottled colorimetry by the presence of a minimum of three mottles in the affected zone, meaning in the nucleus. Here, the idea is to detect a minimum of three closed contours inside the zone. To do that, detecting the contours by an appropriate transformation, like the contourlet transformation, is proposed. This transformation has the distinction of having low energy coefficients (near 0) in homogeneous zones and very high energy coefficients in anisotropic zones (inhomogeneous) which generally correspond to image contours. Estimating the mottled colorimetry is done by following the following steps:

1. Decomposing the image by an appropriate multiscale, multidirectional transformation, like the contourlet or wave atom transformation;
2. Detecting high energy component zones by applying a thresholding to keep only the coefficients corresponding to the contours of the image;
3. Applying a nonlinear contrast enhancement function to the selected (thresholded) coefficients in contourlets;
4. Reconstructing the contour image from the selected coefficients by using the inverse transformation;
5. Detecting the closed contours in the contour image and counting them;
6. If there are more than three closed contours, it will be concluded that the nucleus has a mottled colorimetry.

In a third part, the third method, consisting of merging the first and second methods of calculating the mottled colorimetry, is going to be described.

As with the calculation of the irregularity of the nucleus, combining the results obtained by each of the two preceding methods in order to get a refined result for the expert characteristic of mottled colorimetry anomaly for the nucleus of each cell is proposed here.

It will be understood that by means of the processing module, the set of expert characteristics of calculated anomalies (nucleus/sell ratio, irregularity of the nucleus, hyper-colorimetry and mottled colorimetry) are combined with reference data consisting of reference data known from cytology. In particular, these calculated data can be used either as is, or by a classifier, or merged with other characteristics calculated and generated by deep learning in order to determine whether the cell is normal or has at least one anomaly, step 144. If the sample does not comprise at least one cell having at least one anomaly, then the detection method stops here and if the sample has at least one cell with at least one anomaly, the detection method continues.

At the end of the step of cellular anomaly detection 140, the processing module determines the total number of cells in the cytological sample having at least one anomaly, step 146.

Then, here, a first step of characterization of the sample 150 according to the anomaly level of the sample as a whole may be involved. To do that, the total number of cells detected having at least one anomaly is compared to a threshold value for an anomaly level of the sample. This threshold value for the anomaly level of the sample is defined in advance by the user for the method. The threshold value corresponds to at least three cells each having at least one anomaly. This threshold value for the anomaly level may be defined in advance in any way by the user according to the desired refinement of the classification result.

According to the invention, if the total number of cells with at least one anomaly is less than the threshold value of the anomaly level, the cytological sample is classified in a class representative of a sample with a zero anomaly level 152, if the total number of cells with at least one anomaly is greater than or equal to the threshold value for the anomaly level, the cytological sample is classified in a class representative of a sample with a class with a non-negligible anomaly level 154, meaning a low anomaly level and a high anomaly level 154.

In brief, according to another aspect, the invention at this stage serves in that way to classify the cytological sample according to two classes: a class with a zero cellular anomaly level 152 and a class with a non-negligible level of cellular anomaly 154. This result serves to point out cellular anomalies which are characteristic of cancerous cells. In that way, it serves to help cytotechnicians and cytopathologists in diagnosing cancer by providing a quick and reliable standardized result.

Figure 6:
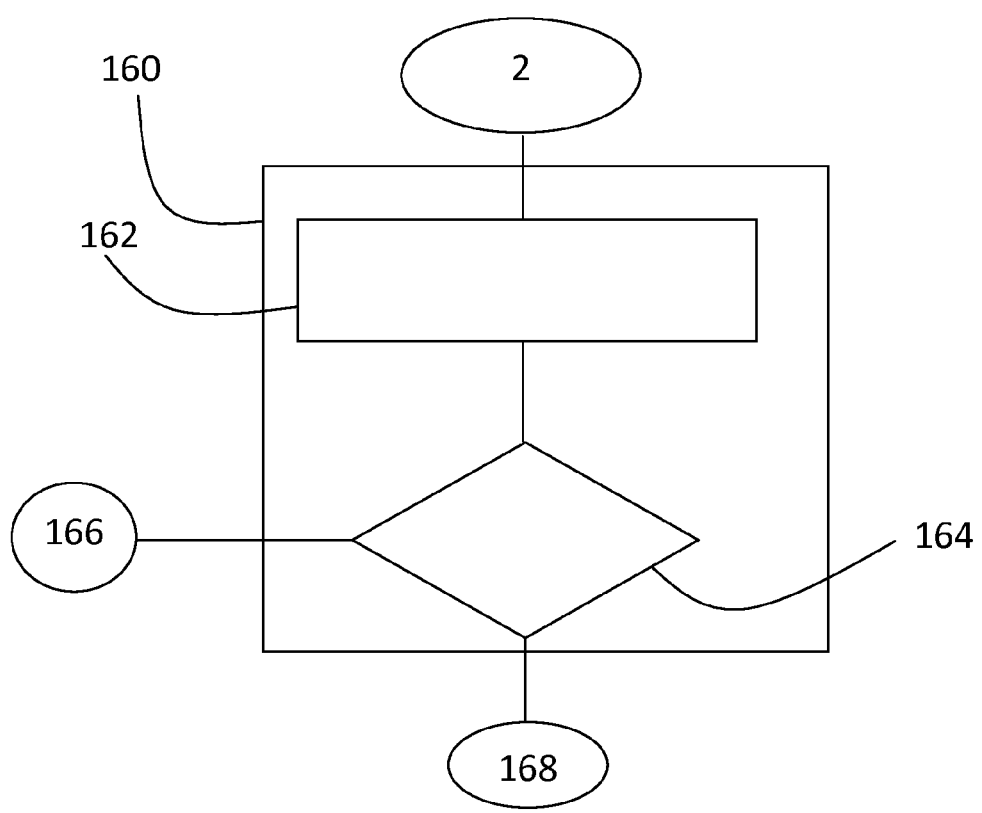
FIG. 6 is a drawing showing various stages of the method implemented according to another embodiment according to which a comprises a second step of characterization of the sample based on a second digitized image.

As shown in FIG. 6, the detection method may comprise a second step of characterization of the sample 160 according to the cellular anomaly level of the sample, in particular specifically showing a low cellular anomaly level in the sample. This anomaly level corresponds to cells having not yet undergone pronounced morphological deformations. Preferably, according to this specific embodiment, the invention serves to classify the sample more precisely either in a cellular anomaly-level class called "low," or in a cellular anomaly class called "high," or in a cellular anomaly-level class referred to as "zero."

Following the abnormal cell detection, the classification of the sample according to the morphological or radiometric anomaly level of these cells from the sample provides a real help for the physician relating to the diagnosis of cancer. In fact, the cellular anomaly level called "low" can be associated with the early stage called "low-grade" of the cancer and the anomaly level called "high" may be associated with the advanced stage of the cancer called "high grade."

For this purpose, in order to detect anomalies at a level called low, the invention uses the second image 2 digitized fluorescence imagery. Based on this second image 2, the cells from at least one selected cell type, such as urothelial, are selected in a typological selection step 162 because of their locations in the sample predefined in the first digitized image 1. The first image 1 and the second image are then registered, possibly by means of a conventional method of registration implemented by computer.

It will be understood that for executing this second characterization step 160, the preliminary step of typological selection 130 based on the first image 1 must necessarily have been done earlier in the method according to the invention in order to be able to locate the cells of the selected cell type.

This substep of typological selection 162 of the cell type is followed by a substep of detection of a fluorescent halo 164 around each previously selected cell. The term "halo" is defined as a phenomenon which is seen by the presence of a fluorescent aura which surrounds the cell and which has a sharp contrast. In an implementation variant, the strength of the halo, the level of fluorescence or the level of spreading of the fluorescence is measured. In that way, if a fluorescence halo is detected, preferably if a minimum level of fluorescence or also preferably a minimum level of spreading of the fluorescence is detected, the sample is classified in a class representative of a sample with a low anomaly level 168. Inversely, cells not having fluorescence are classified in the zero and high anomaly-level class 166.

According to the present invention, three methods are proposed for carrying out the second characterization step for the sample 160 by means of the processing module.

The substeps of the second characterization step for the sample 160 are given in detail below in the context of the first method:

Using the first image 1 and detecting the center of each cell of a selected cell type, using the calculation of the barycenter of the cell;

Tracing an intensity profile along each straight segment starting from the center of the cell out to the limit of each cell along various angles. For example, along 8 angles: 0°, 45°, 90°, 135°, 180°, 225°, 270° and 315°;

detecting the peak Pmax (maximum point) for each profile and also the trough Pmin which precedes the maximum (the minimum point);

Tracing a horizontal line on the curve of the intensity profile starting from the trough Pmin on the right of the peak Pmax to the intersection Pint with the curve of the intensity profile on the left of the peak Pmax;

calculating the horizontal linear distance dx (along the abscissa) between Xmax, the abscissa of the peak, and Xint, the abscissa of the point Pint;

calculating the vertical distance dy (along the ordinate) between Ymax, the ordinate of the peak, and Yint=Ymin, the ordinate of Pint and Pmax;

calculating for each cell detected Dx and Dy which are the average of the dx and dy along the 8 angles. Dy will represent the first estimate of the strength of the fluorescence halo of the halo and Dx a first estimate of the spread of the halo.

The substeps of the second characterization step of the sample 160 are given in detail below in the context of the second method:

Here, measuring and calculating the spread of a fluorescence halo from Radon profiles of the image fragments of the cells is proposed.

The radon transformation represents an image as a collection of projections in various directions. Each projection along the line represents a Radon profile.

The following are the steps to be followed for the second method:
- locate the position of each cell of the selected cell type in the first image 1;
- make the correspondence in the second image 2 for extracting the image fragments corresponding to each cell of the selected cell type by going 10 to 30% past in length and width around each nucleus;
- calculating the Radon profiles corresponding to the image fragments for various angles, preferably the same angles used in the first method;
- for each profile, detecting the two peaks Pmin and Pmax for each radon profile of each image extending 10 to 30% past in length and in width around the nucleus and then following the steps of the first method for calculating a second estimate of the intensity of the halo and the spread thereof.

Alternatively, in the context of a third method, the second characterization step of the sample 160 done by the processing module consists in a method based on the calculation of the irregularity of the contour of the fluorescence "halo" present. In other words, if a cell has a high level of irregularity of the contour of the halo, that means that it has a fluorescence halo. To do this, this third method consists in one of the three methods of the irregularity calculation of the nucleus previously presented.

For the set of the three methods of execution of the second characterization of the sample 160 described above, without limitation, the results obtained for determining the sample class are compared to threshold values of the fluorescence intensity and/or spread levels which were previously determined or entered in advance by a user.

It will be understood that these three methods described can be combined and processed by a learning method in order to get a refined result.

This step of second characterization of the sample 160 thus makes it possible to get, in the end, the classification of the slide of the sample, therefore of the sample, into three possible classes, meaning: either in the zero anomaly-level class, which can be associated with the sample coming from a healthy subject; or in the low cellular anomaly-level class, which can be associated with a sample having cancerous cells at an early stage or called "low-grade" cancer; or in the high cellular anomaly-level class, which can be associated with a sample having cancerous cells at an advanced stage or called "high-grade" cancer.

A second aspect of the invention proposes to use a second method of cellular anomaly detection in the cytological sample by using a deep learning method to do the direct classification of a cytological sample slide image according to a cellular anomaly level found. In general, a deep learning method teaches a computer model how to perform tasks such as classification directly from images. Unlike what is usually done in the field of deep learning and image processing, the originality of this second method is that it classifies a set of image fragments without doing prior classification of each of the image fragments making up the whole of the image. More precisely, this method directly allows the classification of the image of the cytological sample from the slide, meaning the set of cells included in the image of the sample without going through the classification of each image fragment or cell from the sample. It will be noted that this classification method according to the present invention is particularly useful when the detection of anomalies or pathologies can only be done by looking at the entirety of the slide or image of the slide, and not by looking at each cell independently of the others. To do that, this second detection method for cells in the sample having at least one anomaly uses a deep learning computer model, taking a set of observations as input and producing a classification of this set on output. These observations can be directly raw images of the cytological sample and/or a list of values characterizing the image fragment (or descriptive data), for example values calculated using the first method (it will be understood that these descriptive data will have the usefulness of training the computer module). To do this, this second method uses a deep learning method using a deep neural network (NN) architecture. When this deep neural network (NN) is used on raw image fragments, it involves the deep convolutional neural network (CNN). The CNN convolves the learned characteristics with the input data from the descriptor, and uses 2D convolution layers, perfectly suited to the processing of 2D data such as images. The convolutional neural network can extract expert representations of images directly via learning. Just the same, the deep learning method requires considerable calculation power. Since the calculations are highly parallelizable, they are generally done on a graphic processor or GPU. The GPU is high performance and is provided with a parallel architecture, which is effective for implementing this learning method. The GPU is integrated in a processing unit or CPU. Just the same, it is not possible to use the GPU for processing each of the entries independently because the transfer of data from memory to the CPU and to the GPU remains one of the most costly operations in terms of time. Generally, to remedy this problem, deep learning methods use four-dimensional tensors (four-dimensional tables) for generally processing the entries by packet or batch.

Because of this original use of a four-dimensional tensor, this second method of cellular anomaly detection classifies the image, meaning the set of image fragments, without prior detection of each one of them. In other words, this second detection method proposes detecting cells having at least one cellular anomaly and directly classifying not an image fragment but a set of image fragments (raw image fragment and/or image fragment characterized by values calculated in another way) representing the image of a slide of a cytological sample (slide). In order to carry out this second method, the training of the deep learning computer model is done using a large set of labeled slides. Without this training, the second classification method does not work. In this case, the input is a set of image fragments (raw and/or characterized by the first method) and the output is a probability distribution among classes for in the end assigning a class to each image of the set of image fragments from the analyzed sample. According to the invention, the classes will be chosen among a low cellular anomaly-level class, high cellular anomaly-level class and/or a zero cellular anomaly-level class.

Further, this method does an "end to end" training: meaning directly connecting the input to the output without going through an intermediate phase of analysis of each image fragment from an image of a cytological sample. More precisely starting from a set of image fragments of cells from the cytological sample, a network assigns tasks to be accomplished (a classification, for example) and learns how to automate them. Another major advantage of this method is the fact that the algorithms from the learning method develop with the data and continue to improve as the volume of data increases. Preferably, these data come at least in part from data obtained through the detection method according to the first aspect previously described. Again preferably, this second aspect of the detection method could advantageously couple the data from one transmission image and one fluorescence image, meaning from one first and one second image.

The second aspect of the detection method proposed here is the implementation of a deep learning method, setting aside the batch functionality in order to be able to process a set.

Conventionally a four-dimensional tensor is composed of two dimensions for the spatial components the image (one dimension for the height of the image and one dimension for the width), one dimension for the channels (RGB if Red Green Blue are used) and one dimension for the batch "B" (B: corresponding to the number of images for constructing a batch or a packet).

In general, the sole utility of the use of the four-dimensional tensor is accelerating the calculations. The originality of our method is using this tensor for another purpose which is that of classifying populations, here sets of image fragments. Unlike what other learning methods do conventionally, taking a batch B of images and produce B decisions: one decision for each image (the fact of taking B>1 only serves to save time), we take a batch of B image fragments (B: corresponding to the number of image fragments making up the whole of the image) in order to give just one decision based on the set of image fragments. The originality proposed here is in fact using this functionality to make lots which initially exist for reasons of calculation time and to set aside the functionality thereof by using it for another goal and another purpose.

Let us consider a set of image fragments corresponding to a number B (B should be small enough so that the batch can be transferred to the GPU which has a limited memory). Conventionally, the learning methods use a batch of 32 to 64 image fragments to be chosen for accelerating the calculation time. In the context of the invention, a predefined number B is not chosen because this number is used as the number of image fragments of interest, for example the image fragments of urothelial cells per slide image; this number is different from one slide image to another (according to the number of urothelial cells present in the cytological sample on the slide). It is thus possible to form a four-dimensional tensor with these B image fragments: B×RGB×H×W (B: number of image fragments; RGB: for the three color channels Red Green Blue; H and W: respectively for the height and width of the images). It is also possible to consider an arbitrary number of conventional RGB channels for transmission electron microscopes and also an arbitrary number of RGB channels associated with F (F: Fluorescence) for a transmission electron microscope and fluorescence microscope image pair, such as RGB (Red Green Fluorescent). Next, if we transfer this batch into the neural network up to a fully connected layer (meaning a layer of neurons which does not consider the spatial aspect of the preceding layer and which because of that only produces a one-dimensional vector per image fragment), the output will therefore have the size B×F where F is the size of this fully connected layer (thus the four-dimensional tensor was transformed into a two-dimensional tensor).

Now, it is possible to transpose this two-dimensional tensor B×F into a 1×F×B tensor and to apply a symmetric operation on B, for example a one-dimensional pool (maximum or average). This transposition is useful insofar as symmetric operations are programmed natively in order to take place on the dimensions 3 and 4 and not on the dimension 1—since the need of using a fully connected layer is in fact to release these dimensions 3 and 4 for the transposition. This result thus gives a 1×F tensor, where the characteristics F should contain information about the set of image fragments. It will be understood that this 1 results from the fact that this set must lead to 1 single classification digit associated with the batch of B images. In that way, it is possible to use a conventional deep learning method in order to form an end-to-end network for a classification problem of a cytological sample image, meaning a set of images.

Figure 7:
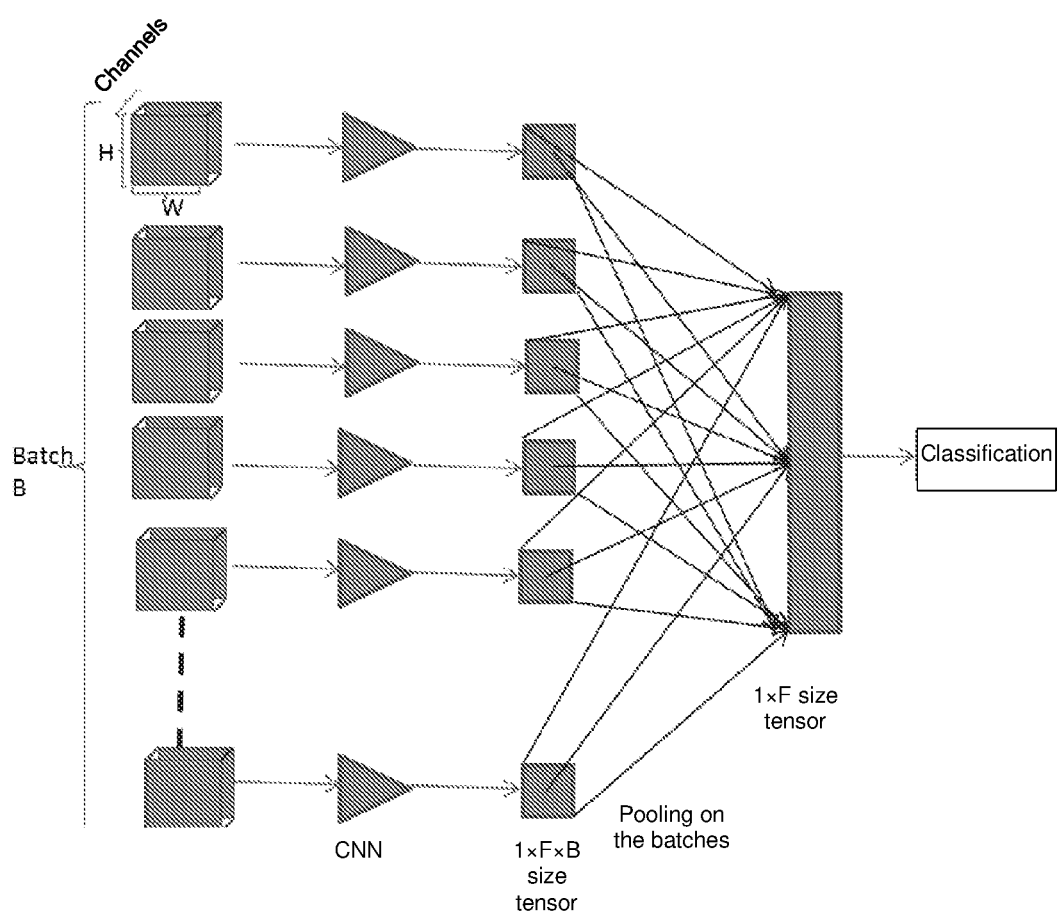
FIG. 7 is a drawing showing a second aspect of the invention, more precisely an implementation methodology for deep learning applied to the classification of at least one cytology sample image corresponding to a set of image fragments.

FIG. 7 summarizes the implementation methodology for deep learning applied to the classification of a cytology sample image corresponding to a set of image fragments. The final class is assigned to a set of image fragments. It will be understood that this implementation method is applied here to the cytological sample image classification but can arbitrarily be applied in other fields without limitation.

According to a second aspect, the invention proposes a cytological sample classification with which to extract and calculate expert characteristics of cellular anomalies present in a sample in order to contribute to the cancer diagnosis, by means of computer vision. Here the invention also proposes according to a second aspect, a second method of cytological sample classification according to the levels of cellular anomalies encountered in the sample, by using a deep learning method which can contribute to diagnosing cancer, by means of computer vision. The invention also relates to a device for cytological sample classification, based on at least one digitized image, suited for implementing such a method. Each user may define the thresholds that it considers for carrying out the classification method. Further, a general approach is proposed which is adaptable to each user according to their need, meaning according to the fields of application and the desired refinement of the result of the classification.

The invention claimed is:

1. A method for detection of cells in a cytological sample having at least one anomaly based on at least one first digitized electron microscope image (1) of the sample, the method is done by means of a computer-implemented processing module, the method comprises a step of processing the first image (110), comprising the following substeps:
   starting from the first image (1), detect each element (4) present in the sample (step 112) and then filter each element (4) selected from at least one isolated cell (10) or one cell group (14), by means of a colorimetric detection;
   starting from each detected group of cells (14), individualize at least one cell with the nucleus thereof, by means of at least one segmentation method based on detection of the contours in the cell group (14) (step 116);

the method further comprises a step of cellular anomaly detection (step 140), comprising the following substeps:
  for each cell isolated (10) or individualized in the preceding step, calculate data for two characteristics of distinct anomalies called "expert characteristics of anomaly," and determine whether said cell has at least one anomaly (step 144), by comparing these calculated data with reference data (step 142);
  and then count the total number of cells in the sample having at least one anomaly (step 146);
the method further comprises a first step of characterization of the sample (step 150) according to an anomaly level for the sample, comprising the following substeps:
  compare the total number of cells having at least one anomaly to a threshold value for the anomaly level, preferably a threshold value equal to at least three cells each having at least one anomaly;
  if the total number of cells having at least one anomaly is less than the threshold value for the anomaly level, classify the sample in a class representative of a sample with a zero anomaly level (152);
  if the total number of cells having at least one anomaly is over the threshold value for the anomaly level, classify the sample in a class representative of a sample with a proven anomaly level (154);
wherein the method further comprises a step of typological selection (step 130), comprising the following substeps:
  starting from the first digitized image (1) of the sample, measuring the size of the cells, and then classifying the cells according to their size (step 132);
  matching each class of measured cells with a corresponding cell type, and then selecting at least one selected cell type.

2. The method according to claim 1, wherein at least one of the expert characteristics of anomaly is a surface area ratio of the nucleus in the cell or an irregularity of the nucleus or a mottled colorimetry or a hyper-colorimetry of the nucleus.

3. The method according to claim 2, wherein at least one of the expert characteristics of anomaly is an irregularity of the nucleus, where the calculation of said irregularity of the nucleus is a deviation calculation corresponding to the comparison between each analyzed cell nucleus and a nucleus type for a cell called "reference," this deviation calculation is selected from the following list: a surface difference, a perimeter difference, a difference of the convexity of the nucleus, a barycenter difference, a difference between a length of the contour of each nucleus detected, a difference of irregularity of a contour of the nucleus, a difference of the number of pixels in each nucleus and a difference of eccentricity of the nucleus in the cell.

4. The method according to claim 2, further comprising a second step of characterization of the sample (step 160) according to an anomaly level of the cells from the sample, further comprising the following substeps:
  starting from a second digitized fluorescence image (2) of the sample, selecting all the cells of a selected cell type according to their location in the sample previously predefined (step 134) in the first digitized image (1) (step 162);
  detecting the presence of a fluorescence halo around each previously selected cell;
  if a fluorescence halo is detected, classify the sample in a class representative of a sample with a low cellular anomaly level (168).

5. The method according to claim 2, further comprising a step of recommendation of usability (step 120) of the cytological sample according to a number of cells comprising a nucleus and according to a minimum usability threshold value.

6. The method according to claim 2, wherein said cytological sample is a urinary sample from spontaneous urination.

7. The method according to claim 1, wherein at least one of the expert characteristics of anomaly is an irregularity of the nucleus, where the calculation of said irregularity of the nucleus is a deviation calculation corresponding to the comparison between each analyzed cell nucleus and a nucleus type for a cell called "reference," this deviation calculation is selected from the following list: a surface difference, a perimeter difference, a difference of the convexity of the nucleus, a barycenter difference, a difference between a length of the contour of each nucleus detected, a difference of irregularity of a contour of the nucleus, a difference of the number of pixels in each nucleus and a difference of eccentricity of the nucleus in the cell.

8. The method according to claim 7, further comprising a second step of characterization of the sample (step 160) according to an anomaly level of the cells from the sample, further comprising the following substeps:
  starting from a second digitized fluorescence image (2) of the sample, selecting all the cells of a selected cell type according to their location in the sample previously predefined (step 134) in the first digitized image (1) (step 162);
  detecting the presence of a fluorescence halo around each previously selected cell;
  if a fluorescence halo is detected, classify the sample in a class representative of a sample with a low cellular anomaly level (168).

9. The method according to claim 7, further comprising a step of recommendation of usability (step 120) of the cytological sample according to a number of cells comprising a nucleus and according to a minimum usability threshold value.

10. The method according to claim 7, wherein said cytological sample is a urinary sample from spontaneous urination.

11. The method according to claim 1, further comprising a second step of characterization of the sample (step 160) according to an anomaly level of the cells from the sample, further comprising the following substeps:
  starting from a second digitized fluorescence image (2) of the sample, selecting all the cells of a selected cell type, according to their location in the sample previously predefined (step 134) in the first digitized image (1) (step 162);
  detecting the presence of a fluorescence halo around each previously selected cell;
  if a fluorescence halo is detected, classify the sample in a class representative of a sample with a low cellular anomaly level (168).

12. The method according to claim 11, wherein the method, by means of the processing module, combines all resulting data and classifies the cytological sample analyzed based on the first image (1) and the second image (2), into one of three classes associated with a cellular anomaly level of the sample: zero, low or high.

13. The method of claim 11, wherein the selected cell type is urothelial, the detecting step includes measuring the fluorescence level, and performing the classifying step if a measured level of fluorescence is over a minimum reference level of fluorescence.

14. The method of claim 13, wherein measuring the fluorescence level comprises measuring a level of spread of the fluorescence, and performing the classifying step if a measured spreading level of the fluorescence is over a minimum spreading level of the fluorescence.

15. The method according to claim 11, further comprising a step of recommendation of usability (step 120) of the cytological sample according to a number of cells comprising a nucleus and according to a minimum usability threshold value.

16. The method according to claim 1, further comprising a step of recommendation of usability (step 120) of the cytological sample according to a number of cells comprising a nucleus and according to a minimum usability threshold value.

17. The method of claim 16, wherein the minimum usability threshold value is equal to at least seven cells detected in the first image comprising a nucleus(1).

18. The method according to claim 1, wherein said cytological sample is a urinary sample from spontaneous urination.

19. The method of claim 1, wherein the comparing substep, wherein the threshold value is equal to at least three cells each having at least one anomaly.

20. The method of claim 1, wherein for the matching substep the selected cell type is the urothelial cell type.

* * * * *